(12) United States Patent
Puig et al.

(10) Patent No.: US 8,447,446 B2
(45) Date of Patent: May 21, 2013

(54) METHOD AND DEVICE FOR DETECTING AN ERRONEOUS SPEED GENERATED BY AN AIR DATA INERTIAL REFERENCE SYSTEM

(75) Inventors: Stéphane Puig, Lauzerville (FR); Pierre Ezerzere, Bouloc (FR)

(73) Assignee: Airbus Operations (SAS), Toulouse Cedex (FR)

( * ) Notice: Subject to any disclaimer, the term of this patent is extended or adjusted under 35 U.S.C. 154(b) by 352 days.

(21) Appl. No.: 12/887,783

(22) Filed: Sep. 22, 2010

(65) Prior Publication Data

US 2011/0071710 A1    Mar. 24, 2011

(30) Foreign Application Priority Data

Sep. 23, 2009 (FR) ...................................... 09 04529

(51) Int. Cl.
*G06F 7/70* (2006.01)

(52) U.S. Cl.
USPC ............................................................ 701/14

(58) Field of Classification Search
None
See application file for complete search history.

(56) References Cited

U.S. PATENT DOCUMENTS 6,205,376 B1    3/2001 Gordon
7,617,023 B2    11/2009 Seve

*Primary Examiner* — Thomas Tarcza
*Assistant Examiner* — Adam Alharbi
(74) *Attorney, Agent, or Firm* — Novak Druce Connolly Bove + Quigg LLP

(57) ABSTRACT

Method and device for detecting an erroneous speed generated by an air data inertial reference system. The device can be configured to detect an erroneous speed provided by an air data and inertial data system and to generate a substitution speed.

8 Claims, 2 Drawing Sheets

METHOD AND DEVICE FOR DETECTING AN ERRONEOUS SPEED GENERATED BY AN AIR DATA INERTIAL REFERENCE SYSTEM

CROSS-REFERENCE TO RELATED APPLICATIONS

This application claims priority to French Application No. 09 04529, which was filed Sep. 23, 2009, the entirety of which is incorporated by reference herein.

FIELD OF THE INVENTION

The present invention relates to a method and a device for detecting an erroneous speed of an aircraft, being delivered by an on-board air data and inertial data measuring system. It also relates to a method and a device for providing a substitution speed should an erroneous speed be detected.

BACKGROUND

The present invention aims at improving the robustness of the systems of an aircraft, in particular a transport airplane, and including the ADIRS (Air Data Inertial Reference System) type air data and inertial data system, which, as known, represents an inertial reference station integrating the functions of the anemobarometric station. Such an air data and inertial data system being on board the aircraft usually provides, in real time, in particular a TAS (True Air Speed) type air speed and a conventional CAS (Calibrated Air Speed) type speed. Such a measurement system comprises, to this end, in particular, specifically total pressure probes (Pitot tubes).

Now, when such pressure probes are obstructed or frozen, it could lead to a loss of air data, and including to an alteration of the flight control primary functions. In particular, this could lead to excursions beyond the limit speeds, resulting in adverse effects on the stability of the aircraft. Erroneous or absent air data could, for example, occur upon breakdowns of systems, erroneous information of sensors, or upon the presence of frost or ice crystals.

It is known that frost is a meteorological phenomenon, the occurrence conditions of which are related to humidity and to static temperature. In the presence of frost, an accretion phenomenon can occur on the leading edges of the wings, of the stabilizer and of the rudder, as well as on all bumps. Frost can also have effects on sensors, such as total pressure probes, as far as leading to the measurement being altered, making it sometimes erroneous (frozen or biased).

It is thus necessary to be able to detect an error in the measurements performed by an air data and inertial data system, in particular an error in the speed provided by such a system.

Generally, aircrafts comprise systems comparing between them the information provided by different sensors. Thus, if most of the sensors provide a similar value, such a value could be considered as true. However, in some cases, being actually very rare, such sensors could be, either all or most of them, submitted to a similar frost phenomenon, so that the systems of the aircraft and the pilots can be without any reliable indication about speed or be unable to eliminate the erroneous speed(s).

SUMMARY OF THE INVENTION

The present invention aims at overcoming these drawbacks. It relates to a method for detecting, in a particularly reliable and efficient way, an erroneous speed of an aircraft, being provided by an on-board air data and inertial data measuring system generating and providing, in real time, an air speed and a conventional speed.

To this end, according to this invention, said method is remarkable in that, automatically:

A/ by means of an air speed and a conventional speed, being received from said measurement system, as well as of values of auxiliary parameters relating to the aircraft, being measured by on-board sources of information being distinct from said measurement system, periodically, a theoretical conventional speed of the aircraft is estimated; and B/ for each thus estimated theoretical conventional speed, during a predetermined period, the current conventional speed generated (nearly in real time) by said measurement system is compared with such estimated theoretical conventional speed, and an erroneous speed is detected in case of a mismatch between said current and estimated conventional speeds.

Advantageously, at step A/, the following operations are performed:

a) periodically, an air speed and a conventional speed received from said measurement system are memorized;

b) by means of said on-board sources of information being distinct from said measurement system, values of auxiliary parameters relating to the aircraft are measured;

c) by means of said measured values, the drag and the thrust of the aircraft are estimated;

d) by means of said estimated drag and thrust and of said memorized air and conventional speeds, a theoretical air speed is calculated; and e) by means of said theoretical air speed, said theoretical conventional speed is estimated.

Thus, thanks to this invention, a theoretical conventional speed is estimated from a previously measured and memorized speed and from values being measured and provided by sources of information being distinct from the measurement system, and that are thus not affected by a measurement problem of the latter, in particular when one or more probes of such a measurement system is or are obstructed. By comparing the current conventional speed provided by the measurement system with such an estimated theoretical conventional speed, it is possible to detect a mismatch due to a (conventional) erroneous speed. Thus, it is possible to detect, in a reliable and efficient way, the generation of an erroneous speed by an on-board air data and inertial data measuring system.

Within the scope of the present invention, as estimating the theoretical conventional speed is achieved by means of a memorized value, it is considered that such a speed does not change for a predetermined duration, for example, for two minutes, and it can thus be used for detecting an error of the current conventional speed during this period.

Additionally, advantageously:

at step A/ d), the theoretical air speed is calculated through an integration, taking into account an equation for the propelling balance of the aircraft; and/or at step A/ e), a periodical adjustment of the estimated theoretical conventional speed is performed on current values of auxiliary parameters.

Furthermore, advantageously, at step A/ e), the following successive operations are performed:

by means of the calculated theoretical air speed and of a static temperature, a Mach number is calculated;

a static pressure is calculated;

a total pressure is calculated by means of said Mach number; and said theoretical conventional speed is calculated by means of said static and total pressures.

Moreover, advantageously, at step B/, the following successive operations are performed:

the difference is calculated between the current conventional speed and the theoretical conventional speed;

said difference is compared with a predetermined threshold value; and if said difference is higher than said threshold value, an erroneous speed is detected and a warning signal is emitted.

In a preferred embodiment, should an erroneous speed be detected, an auxiliary conventional speed is calculated being intended to replace an erroneous speed issued from said measurement system. To this end, advantageously:

periodically, an air speed and a conventional speed received from said measurement system are memorized;

upon an erroneous speed being detected at step B/, an auxiliary conventional speed is estimated by means of the air speed and the conventional speed being last memorized before said detection, as well as values of auxiliary parameters relating to the aircraft, measured by on-board sources of information being distinct from said measurement system Moreover, advantageously, for estimating said auxiliary conventional speed:

by means of said on-board sources of information being distinct from said measurement system, values of auxiliary parameters relating to the aircraft are measured;

by means of said measured values, the drag and the thrust of the aircraft are estimated;

by means of said estimated drag and thrust and of said memorized air and conventional speeds, a theoretical air speed is calculated; and said auxiliary conventional speed is estimated by means of said auxiliary air speed.

Thus, thanks to such a preferred embodiment, it is possible to generate an auxiliary conventional speed that could be used instead of the speed issued from the air data and inertial data measuring system, which has been detected as erroneous. Such an auxiliary (substitution) conventional speed could be more particularly used by display means of the cockpit. It can also be used by flight controls of the aircraft, allowing to improve the availability of the steering laws should the air speed information be lost.

The present invention further relates to a device for detecting an erroneous speed of an aircraft, being provided by an on-board air data and inertial data measuring system.

According to this invention, said device is remarkable in that it comprises:

first means for estimating, periodically, a theoretical conventional speed of the aircraft, by means of an air speed and of a conventional speed, received from said measurement system, as well as values of auxiliary parameters relating to the aircraft, measured by on-board sources of information being distinct from said measurement system; and second means for comparing, for a predetermined duration, a current conventional speed generated by said measurement system at the theoretical conventional being the last estimated by said first means, and for detecting an erroneous speed should a mismatch occur between said current and estimated conventional speeds.

In a particular embodiment, said device further comprises:

third means for memorizing periodically an air speed and a conventional speed received from said measurement system; and fourth means for estimating, upon an erroneous speed being detected by said second means, an auxiliary conventional speed, and this, by means of the air speed and the conventional speed being last memorized by said third means before such a detection, as well as values of auxiliary parameters relating to the aircraft, which have been measured by on-board sources of information being distinct from said measurement system.

Furthermore, the present invention further relates to a speed generating system for an aircraft, comprising:

an air data and inertial data measuring system, generating and providing in real time an air speed and a conventional speed;

sources of information being distinct from said measurement system and providing the values of the auxiliary parameters (incidence, slope, mass, etc.) relating to the aircraft; and a device such as specified above, using values provided by said measurement system and by said sources of information, for at least detecting an erroneous speed provided by the measurement system (and for determining a substitution speed in the case of an erroneous speed).

The present invention further relates to an aircraft, in particular a transport airplane, comprising a device and/or a system such as mentioned hereinabove.

BRIEF DESCRIPTION OF THE DRAWINGS

The figures of the appended drawing will better explain how this invention can be implemented. In these figures, like reference numerals relate to like components

DETAILED DESCRIPTION

The device 1 according to the invention is adapted:

on the one hand, to detect an erroneous speed of an aircraft, said speed being provided by an on-board air data and inertial data measuring system 3; and on the other hand, to generate an auxiliary speed intended to replace, if applicable, a thus detected erroneous speed.

Said device 1 is thus associated with an air data and inertial data measuring system 3, in particular of the ADIRS (Air Data Inertial Reference System) type. Such a measurement system 3 comprising a plurality of probes, in particular of total pressure probes (or Pitot tubes), is intended to perform measurements of air data and inertial data and is, more specifically, able to determine different speeds by means of such measurements. In particular, said measurement system 3 is able to generate and to provide, the outlet thereof, in real time:

a conventional speed (or corrected speed) of the CAS (Calibrated Air Speed) type; and an air speed (or true speed), including of the TAS (True Air Speed) type.

Figure 1:
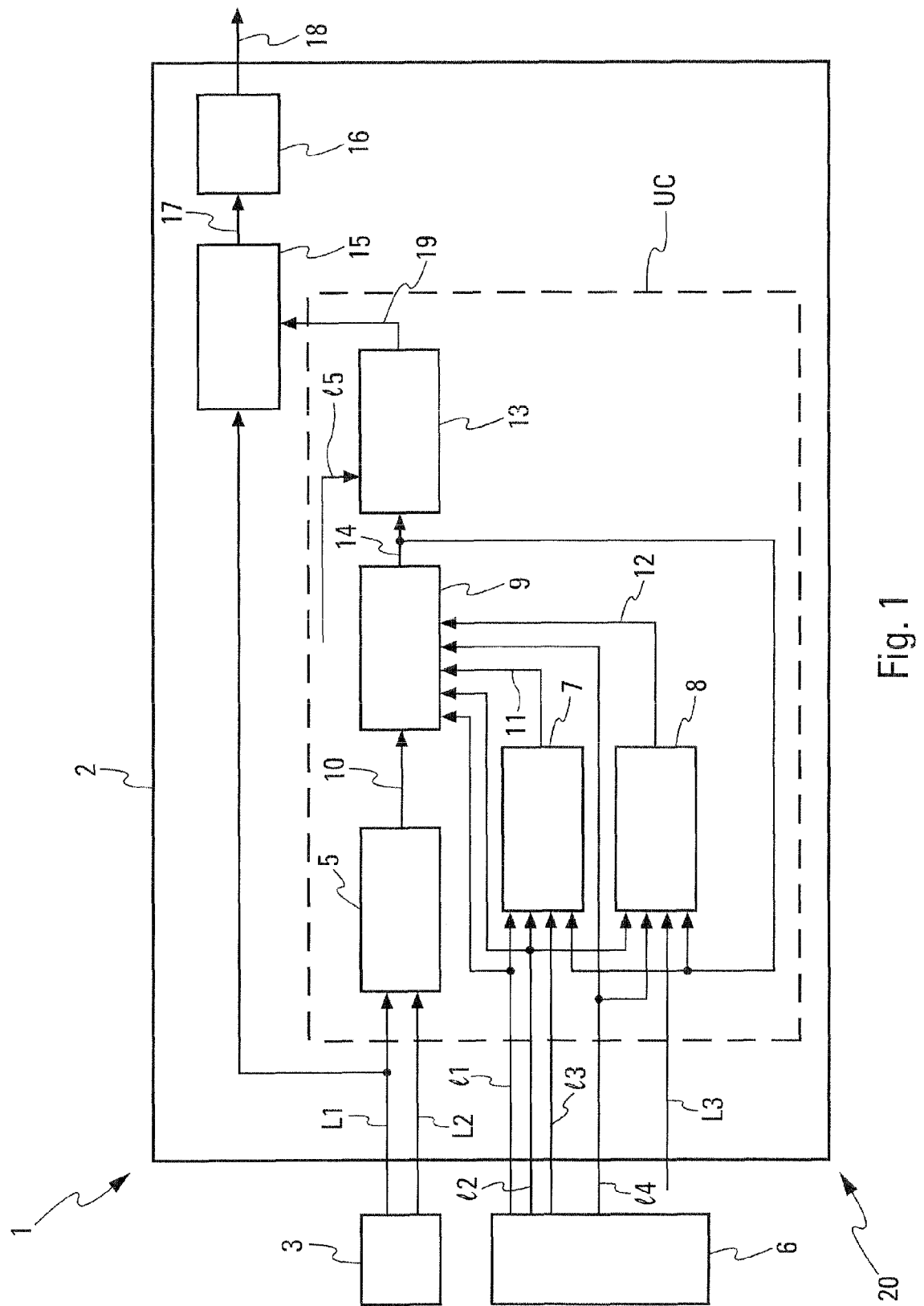
FIG. 1 is the block diagram of a device according to the invention, provided with means for detecting an erroneous speed of an aircraft.

Said device 1 comprises a unit 2 represented on FIG. 1 for detecting an erroneous speed provided by said measurement system 3. Within the scope of the present invention, an erroneous speed relates to a erroneous conventional speed (of the CAS type).

To this end, said unit 2 comprises:

means, in particular links L1 and L2, for receiving, respectively, a value of a CAS conventional speed and a value of a TAS air speed, generated by said system 3. The latter determines, in real time, in a usual way, said conventional and air speeds;

means 5 for memorizing periodically the values of the air speed and the conventional speed, received from said measurement system 3 via the links L1 and L2. Said means 5 memorize the speed values at predetermined time periods T1, for example, every two minutes;

means, in particular links 11 à 15, for receiving the values of the auxiliary parameters relating to the aircraft and specified below. Such values are provided by a set 6 of usual sources of information of the aircraft. Such sources of information are distinct from said measurement system 3 and are thus not affected by a breakdown of said measurement system 3 or of a probe thereof;

means 7 for performing an estimation of the drag of the aircraft, including from auxiliary values received via the links 11 to 13 of said set 6;

means 8 for calculating the thrust of the aircraft, from, more particularly, auxiliary values received from said set 6 via the links 12 and 14;

means 9 being connected via the links 10, 11 and 12, respectively to said means 5, 7 and 8, as well as via the links 11, 12 and 14 to said set 6, and being formed so as to calculate a theoretical air speed, including by means of values memorized by said means 5;

means 13 being connected via a link 14 to said means 3 and via a (partially shown) link 15 to said set 6 and being formed so as to determine a theoretical conventional speed by means of the theoretical air speed received from said means 9;

means 15 comparing each current conventional speed received (practically in a continuous mode) from said system 3 with the theoretical conventional speed calculated by said means 13 (and received via a link 19) so as to able to detect a mismatch between such speeds, that is when the current conventional speed deviates significantly from the calculated theoretical conventional speed; and means 16 being connected via a link 17 to said means 15 and emitting a warning signal when the current conventional speed (provided by the measurement system 3) deviates from the calculated theoretical conventional speed, as set forth hereinbelow.

Within the scope of the present invention, estimating the theoretical conventional speed is thus achieved by means of at least one memorized conventional speed value (by means 5). It is considered that such an estimated theoretical conventional speed does not change for one predetermined duration, for example for two minutes, and it can therefore be used for such a duration, for detecting an error of the current conventional speed.

Said means 16 could emit a warning signal of the sound type and/or the visual type. They can also transmit such a warning signal via a link 18 to user means, as specified below.

In a particular embodiment, said means 5, 7, 8, 9 and 13 are part of one single calculation unit UC.

Thus, thanks to said unit 2, the device 1 is adapted to estimate a theoretical conventional speed, from, more particularly, a previously measured (by the measurement system 3) and memorized CAS speed, as well as values measured and provided by sources of information being distinct from the measurement system 3, and that are thus not affected by a measurement problem on the latter, in particular when one or more probes of such a measurement system 3 is or are obstructed. By comparing the current conventional speed provided by the measurement system 3 with such theoretical conventional speed estimated by means 13, said unit 2 is able to detect a mismatch due to an erroneous current conventional speed. Thus, said device 1 is able to detect, in a reliable and efficient way, the generation of an erroneous speed by a usual on-board air data and inertial data measuring system 3.

In a particular embodiment, said device 1 is part of an on-board speed generating system 20, comprising, in addition to said device 1, said measurement system 3 and said set 6 of sources of information.

Means 5 of the unit 2 thus record, at regular time intervals T1, for example every minute or every two minutes, the current speeds (air speed and conventional speed), that is the speed values existing at the time of the recording, such values being provided in real time by the measurement system 3. Such speeds are then used for calculating the theoretical air speed for one determined time duration. Consequently, the calculation is performed again at regular time intervals.

In the example of FIG. 1, said set 6 of sources of information transmits to unit 2, via:

the link 11, the incidence angle α of the aircraft;
the link 12, the mass M of the aircraft;
the link 13, the flight configuration of the aircraft, that is the positions of the slats and of the flaps in the case of an airplane;
the link 14, the slope of the aircraft; and
the link 15, the altitude as determined by a satellite positioning system of the GPS type.

In addition, said means 7 determine, in a usual way, by means of a usual modelling, a drag coefficient Cx of the aircraft, from the incidence a, the mass M, the configuration and an air speed value received from said means 9. Should frost be present, a bias can be added corresponding to such a presence of frost, for reducing the error due to such a presence and not generating too significant an error in the absence of frost.

In addition, said means S estimate, in a usual way, the thrust F of the aircraft. In a preferred embodiment, said means 8 use a training (of the neuron network type) with respect to a flight point, as a function of the following parameters:

the altitude;
the speed;
the mass M;
the slope;
the temperature deviation ΔISA with respect to a perfect atmosphere, determined by means of a SAT static temperature received from the system 3 via a (partially shown) link L3; and
the thrust level.

Furthermore, said means 9 calculate the theoretical air speed through an integration performed at each step. To this end, said means 9 take into account the equation of the propelling balance of the aircraft, which could be written as follows:

$$M \cdot dV/dt = (\rho \cdot S \cdot V^2 \cdot Cx)/2 + F \cdot \cos \alpha - M \cdot g \cdot \sin \gamma,$$

wherein:
M is the mass of the aircraft (in kg);
V is the air speed (in m/s);
S is the reference surface (in m$^2$) representing the surface of the airfoils;
$\rho$ is the volume mass of the air (in kg/m$^3$);
α is the angle of incidence;
γ is the angle between the trajectory and the horizontal;
F is the jet thrust (in N), calculated by means 8;
g is the earth acceleration (in m/s$^2$); and
Cx is the drag coefficient, calculated by means 7.

The calculation as implemented by means 9 uses an integrator that could deviate from initial errors or biases.

Furthermore, said means 13 comprise (not shown) integrated means adapted to perform, respectively, the following successive operations consisting in:

through the calculated theoretical air speed (and received from means 9) and a SAT static temperature, calculating a Mach number;

calculating a static pressure;

calculating a total pressure through said Mach number; and calculating said theoretical conventional speed by means of said static and total pressures.

Moreover, if the SAT static temperature (received from the measurement system 3) is erroneous, means 13 estimate the static temperature from the last measured valid temperature and from the GPS altitude received via the link 15.

Furthermore, said means 15 comprise (not shown) integrated means for performing, respectively, the following successive operations consisting in:

calculating the difference between the current conventional speed, received from the system 3, and the theoretical conventional speed, calculated by the calculation unit UC;

comparing said difference with a predetermined threshold value; and if said difference is higher than said threshold value, detecting an erroneous speed and emitting a warning signal.

Consequently, thanks to the unit 2, the device 1 is able to detect, in real time, on board the aircraft, a risk of an erroneous conventional speed provided by an air data and inertial data measuring system 3.

Figure 2:
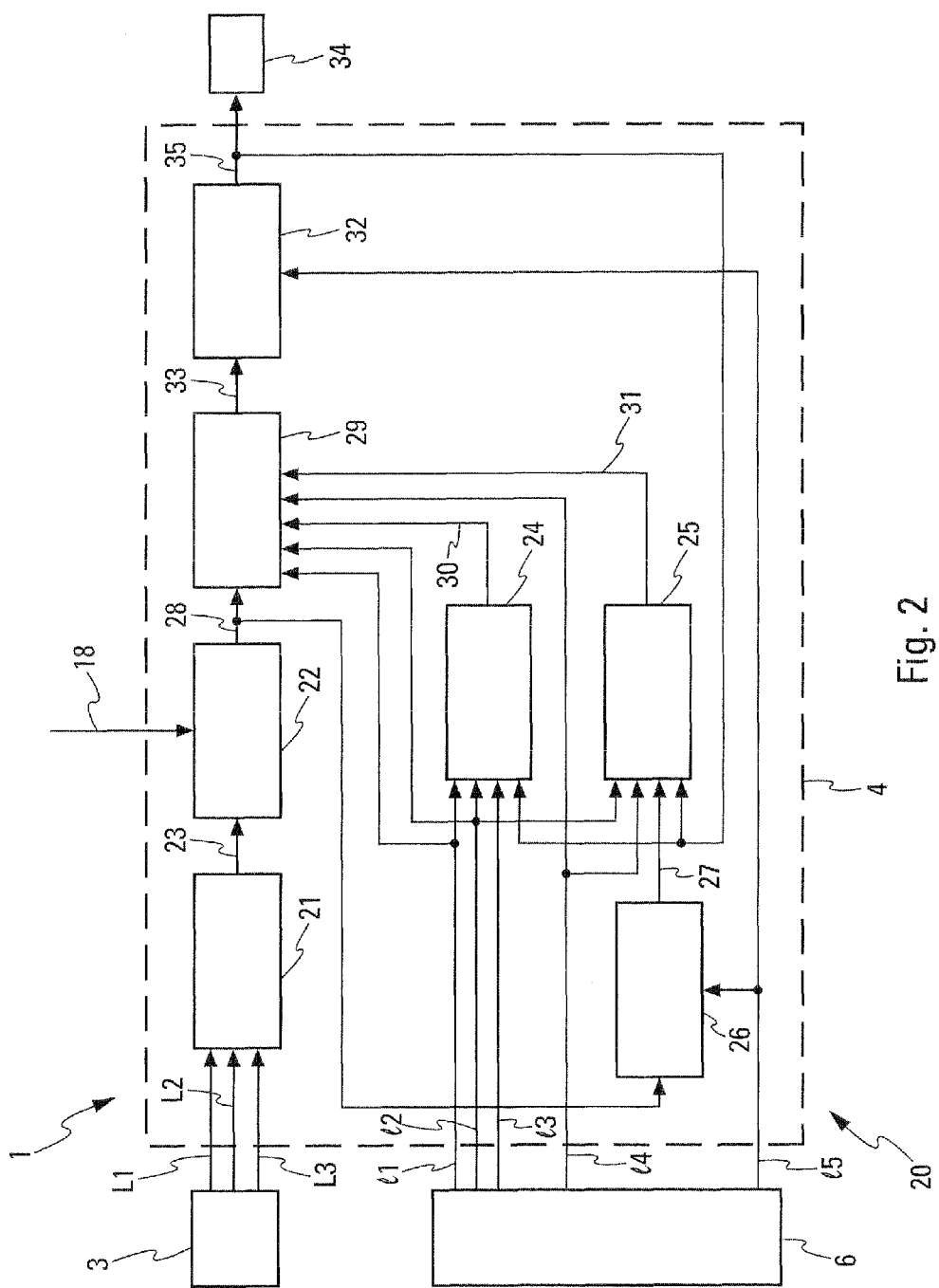
FIG. 2 is the block diagram of a device according to the invention, provided with means for determining a substitution speed.

Furthermore, in a preferred embodiment, said device 1 further comprises a unit 4 shown on FIG. 2. Such a unit 4 allows a CAS conventional speed auxiliary value to be generated, being intended to replace an erroneous conventional speed, when such a situation is detected by the unit 2.

To this end, said unit 4 comprises:

means, for example the links L1 and L2, for receiving, respectively, a value of conventional speed and a value of air speed, generated in real time by said system 3;

means 21 for instance similar to means 5, for memorizing, periodically, the values of the air speed and the conventional speed, received from said measurement system 3 via the links L1 and L2. Said means 21 memorize such values periodically, according to a predetermined period of time T2, for example every two seconds;

means 22 for transmitting the values of air speed and conventional speed being last memorized by means 21, when they receive a warning signal of the unit 2 via the link 18, that is when the unit 2 has detected an erroneous speed;

means, in particular links 11 à 15, for receiving the values of the auxiliary parameters relating to the aircraft and specified below. Such values are provided by the set 6 of usual sources of information of the aircraft. Such sources of information are distinct from said measurement system 3 and are thus not affected by a breakdown of said measurement system 3 or a probe thereof;

means 24, preferably similar to means 7, performing as herein above described, an estimation of the drag of the aircraft, from auxiliary values received via the links 11 to 13 of said set 6;

means 26 for estimating, in a usual way, a static temperature from the last measured static temperature and the GPS altitude received via the link 15;

means 25, preferably similar to means 8, for calculating as herein above described, the thrust of the aircraft, from, more particularly, auxiliary values received from said set 6 and from the static temperature received from means 26 via a link 27;

means 29, preferably similar to means 9, being connected via the links 28, 30 and 31, respectively to said means 22, 24 and 25, as well as via the links 11, 12 and 14 to said set 6, and being formed so as to calculate (as set forth above) an auxiliary theoretical auxiliary air speed, more particularly by means of the values received from said means 22; and means 32, preferably similar to means 13, being connected via a link 33 to said means 29 and via the link 15 to said set 6, and being formed so as to determine (as set forth above) an auxiliary conventional speed by means of the auxiliary theoretical auxiliary air speed received from said means 29.

Consequently, the unit 4 of the device 1 memorizes the speeds provided by the measurement system 3 at short time intervals T2, for example every two seconds. Should a breakdown be detected and the parameters be unavailable, the unit 4 uses the last memorized speed as the starting point for a calculation of the auxiliary conventional speed.

According to the invention, said unit 4 uses, for determining the substitution information, information that is not erroneous in the case of a breakdown of some sensors of the measurement system 3, and takes profit of them for estimating the auxiliary (conventional) speed. The information necessary to elaborating the auxiliary speed (that is, the slope, the mass, the surface of the airfoils, the leading angle, the altitude) is available on board the aircraft and remain valid in the presence of frost. Such information is issued from said set 6. As far as the values generated by the measurement system 3 are concerned, that it the speed, the pressure and the altitude, being likely to be erroneous in case of frost, as they depend on the dynamic pressure intake, they can be estimated from non erroneous remaining parameters.

The auxiliary speed calculated by the unit 4 can be transmitted via a link 35 to user means 34, in particular the display means of the cockpit.

However, in a preferred embodiment, said user means 34 comprise a usual system for controlling the flight of the aircraft. Thus, it is possible to improve the availability of the steering laws should the air speed information provided by the air data and inertial data measuring system 3 be lost, including upon probes being obstructed, in particular total pressure probes, of said measurement system 3.

Consequently, the device 1 according to the invention allows to determine, upon the presence of a plurality of systems 3 on the aircraft (as it is generally the case), which one of the air data and inertial data measuring systems 3 of the aircraft emits, if applicable, an erroneous speed. Moreover, should all the measurement systems 3 of the aircraft be unavailable, said device 1 allows to provide substitution information (auxiliary conventional speed) for a given time period (the presence of frost is a temporary phenomenon), such information being optionally used by a system for controlling the flight and by display means of the aircraft.

The invention claimed is:

1. A method for detecting an erroneous speed of an aircraft, provided by an on-board air data and inertial data measuring system (3), said measurement system (3) being able to generate and to provide in real time an air speed and a conventional speed, comprising, automatically:

A/ performing the following operations:

a) an air speed and a conventional speed are periodically memorized, being received from said measurement system (3);

b) by means of said on-board sources of information being distinct from said measurement system (3), values of auxiliary parameters relating to the aircraft are measured;

c) by means of said measured values, the drag and the thrust of the aircraft are estimated;

d) by means of said estimated drag and thrust and said memorized air and conventional speeds, a theoretical air speed is calculated through an integration, taking into account an equation of the propelling balance of the aircraft; and e) by means of said theoretical air speed, said theoretical conventional speed is estimated; and B/ for each thus estimated theoretical conventional speed, during a predetermined period, the current conventional speed generated by said measurement system (3) is compared with such an estimated theoretical conventional speed, and an erroneous speed is detected in case of a mismatch between said current and estimated conventional speeds.

2. The method according to claim 1, wherein at step A/ e), a periodical adjustment is performed of the theoretical conventional speed estimated on current values of auxiliary parameters.

3. The method according to claim 1, wherein step A/ e), the following successive operations are performed:

by means of the calculated theoretical air speed and a static temperature, a Mach number is calculated;

a static pressure is calculated;

a total pressure is calculated by means of said Mach number; and said theoretical conventional speed is calculated, by means of said static and total pressures.

4. The method according to claim 1, wherein at step B/, the following successive operations are performed:

a) the difference is calculated between the current conventional speed and the theoretical conventional speed;

b) said difference is compared with a predetermined threshold value; and c) if said difference is higher than said threshold value, an erroneous speed is detected and a warning signal is emitted.

5. The method according to claim 1, for generating an auxiliary conventional speed should an erroneous speed be detected, wherein, additionally:

periodically an air speed and a conventional speed received from said measurement system are memorized;

upon an erroneous speed being detected at step B/, an auxiliary conventional speed is estimated by means of the air speed and the conventional speed being last memorized before said detection, as well as values of auxiliary parameters relating to the aircraft, that have been measured by on-board sources of information (6) being distinct from said measurement system (3).

6. A device for detecting an erroneous speed of an aircraft, provided by an on-board air data and inertial data measuring system (3), said measurement system (3) being able to generate and to provide in real time an air speed and a conventional speed, wherein said device comprises:

a calculating unit configured to perform the following operations:

a) an air speed and a conventional speed are periodically memorized, being received from said measurement system (3);

b) by means of said on-board sources of information being distinct from said measurement system (3), values of auxiliary parameters relating to the aircraft are measured;

c) by means of said measured values, the drag and the thrust of the aircraft are estimated;

d) by means of said estimated drag and thrust and said memorized air and conventional speeds, a theoretical air speed is calculated through an integration, taking into account an equation of the propelling balance of the aircraft; and e) by means of said theoretical air speed, said theoretical conventional speed is estimated; and a comparing unit configured to comparing, for a predetermined duration, a usual conventional speed generated by said measurement system (3) at the theoretical conventional speed being the last estimated by said calculating unit (UC), and for detecting an erroneous speed should a mismatch occur between said current and estimated conventional speeds.

7. The device according to claim 6, comprising:

a memory unit comprising a controller and a memory configured to store in the memory, periodically, an air speed and a conventional speed received from said measurement system (3); and an estimating unit configured to estimate, upon an erroneous speed being detected by said comparing unit, an auxiliary conventional speed, and this, by means of the air speed and of the conventional speed, memorized the last before such detection by said memory unit, as well as values of auxiliary parameters relating to the aircraft, which have been measured by on-board sources of information (6) being distinct from said measurement system (3).

8. A speed generating system for an aircraft, comprising:

an air data and inertial data measuring system (3) generating and providing in real time an air speed and a conventional speed;

sources of information (6) being distinct from said measurement system (3) and providing the values of the auxiliary parameters relating to the aircraft; and a device (1) such as that specified in claim 6, using the values provided by said measurement system (3) and by said sources of information (6) for at least detecting an erroneous speed provided by the measurement system (3).

* * * * *